United States Patent
Yano et al.

(10) Patent No.: US 9,812,776 B2
(45) Date of Patent: Nov. 7, 2017

(54) ANTENNA DEVICE

(71) Applicant: Furuno Electric Co., Ltd., Nishinomiya (JP)

(72) Inventors: Kohji Yano, Nishinomiya (JP); Mitsuhiko Hataya, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/390,021

(22) PCT Filed: Apr. 1, 2013

(86) PCT No.: PCT/JP2013/059843
§ 371 (c)(1),
(2) Date: Oct. 1, 2014

(87) PCT Pub. No.: WO2013/150994
PCT Pub. Date: Oct. 10, 2013

(65) Prior Publication Data
US 2015/0054703 A1   Feb. 26, 2015

(30) Foreign Application Priority Data
Apr. 2, 2012 (JP) ................... 2012-084030

(51) Int. Cl.
*H01Q 3/08* (2006.01)
*H01Q 21/06* (2006.01)
(Continued)

(52) U.S. Cl.
CPC .............. *H01Q 3/08* (2013.01); *G01S 7/03* (2013.01); *H01P 1/064* (2013.01); *H01Q 1/125* (2013.01);
(Continued)

(58) Field of Classification Search
CPC .................. H01Q 3/08; H01Q 1/125
(Continued)

(56) References Cited

U.S. PATENT DOCUMENTS 2,415,678 A * 2/1947 Edwards .................. H01Q 3/08
318/282
2,544,433 A   3/1951 Moseley
(Continued)

FOREIGN PATENT DOCUMENTS

EP    1246296 A1   10/2002
GB    1532415 A    11/1978
(Continued)

OTHER PUBLICATIONS

ISA Japanese Patent Office, International Search Report of PCT/JP2013/059843, dated Jun. 18, 2013, 4 pages.
(Continued)

*Primary Examiner* — Dameon E Levi
*Assistant Examiner* — David Lotter
(74) *Attorney, Agent, or Firm* — Alleman Hall Creasman & Tuttle LLP

(57) ABSTRACT

An antenna device vertically rotatable and horizontally rotatable is provided, which has a configuration in which waveguides are effectively disposed. An antenna device includes an antenna, a vertically rotating, and a rotary joint. The antenna is vertically rotatable and horizontally rotatable, and outwardly radiates a radio wave. The vertically rotating is disposed such that a longitudinal direction thereof is along an axial line of the vertical rotation and intersects perpendicularly with an axial line of the horizontal rotation. The rotary joint is coupled to the vertically rotating. Moreover, the antenna device includes a waveguide path passing through the inside of the rotary and the inside of the vertically rotating and connected with the antenna.

10 Claims, 7 Drawing Sheets

(51) Int. Cl.
H01P 1/06 (2006.01)
H01Q 13/00 (2006.01)
G01S 7/03 (2006.01)
H01Q 1/12 (2006.01)
H01Q 19/19 (2006.01)
G01S 13/95 (2006.01)

(52) U.S. Cl.
CPC .......... H01Q 13/00 (2013.01); H01Q 19/193 (2013.01); H01Q 21/064 (2013.01); *G01S 13/95* (2013.01)

(58) Field of Classification Search
USPC ........................................ 343/757, 762, 761
See application file for complete search history.

(56) References Cited

U.S. PATENT DOCUMENTS

| | | | | |
|---|---|---|---|---|
| 4,209,789 | A * | 6/1980 | Snedkerud | H01Q 1/34 343/765 |
| 2004/0150574 | A1 * | 8/2004 | Harron | H01Q 3/08 343/765 |
| 2011/0291878 | A1 * | 12/2011 | Mclaughlin | G01S 13/951 342/26 D |
| 2012/0235882 | A1 * | 9/2012 | Iverson | H01Q 3/02 343/905 |
| 2014/0009330 | A1 * | 1/2014 | Knight | G01S 13/95 342/26 R |

FOREIGN PATENT DOCUMENTS

| | | |
|---|---|---|
| JP | S6030613 U | 3/1985 |
| JP | H07249920 A | 9/1995 |
| JP | H07326901 A | 12/1995 |
| JP | H09199924 A | 7/1997 |
| JP | 2004312270 A | 11/2004 |

OTHER PUBLICATIONS

"Sat-nms ACU-ODM/ACU19 Antenna Control Unit—Outdoor Module—User Manual," Nov. 9, 2011, XP055217306, and "sat-nms Antenna Control and Tracking System," Jan. 13, 2012, XP055216889, Available Online at https://web.archive.org/web/20120113221537/http://ww.satnms.com/en/products/acu.html, 4 pages.
European Patent Office, Extended European Search Report Issued in Application No. 13772821.8, dated Oct. 22, 2015, 11 pages.

* cited by examiner

ANTENNA DEVICE

TECHNICAL FIELD

This disclosure relates to an antenna device, which is vertically rotatable and horizontally rotatable.

BACKGROUND ART

Conventionally, for antenna devices provided to weather radars and the like, a configuration has been known, which can vertically rotate to change an elevation angle of the antenna and can horizontally rotate to change an azimuth of the antenna to orient an open face of the antenna and the like toward an observation target. Moreover, a configuration for, for example, a case of performing satellite communication has been known, which can vertically rotate and horizontally rotate to orient the open face of the antenna and the like toward a direction of the satellite.

Patent Document 1 discloses an antenna device (antenna orienting device) which can vertically and horizontally rotate. This antenna device has a base configured to support the antenna and the like. Further, an azimuth servomotor that is a power source for the horizontal rotation is disposed on the base. Moreover, an elevation servomotor that is a power source for the vertical rotation is disposed to a back side of the antenna (opposite side to a radiation face).

Patent Document 2 discloses an antenna device (antenna power feeding device) using a radio wave comprised of a vertical polarized wave and a horizontal polarized wave. In this antenna device, a part configured to generate the radio wave is connected with a part (antenna) configured to radiate the ratio wave, via a rotary joint (rotational coupler).

Patent Document 3 discloses an antenna device using a radio wave comprised of a vertical polarized wave and a horizontal polarized wave. This antenna device includes two rotary joints in the vicinity of an edge part (a part away from the center) of the antenna. Further, a waveguide for the vertical polarized wave and a waveguide for the horizontal polarized wave are respectively disposed to reach a central part of the antenna via these rotary joints.

With these configurations, a rotational shaft for the vertical rotation of the antenna passes through the inside of the antenna, and therefore, an operation area of the antenna when vertically rotating can be suppressed.

REFERENCE DOCUMENTS OF CONVENTIONAL ART

Patent Document(s)

Patent Document 1: JPH07-249920A
Patent Document 2: JP3058007B
Patent Document 3: JP4011511B

DISCLOSURE OF THE INVENTION

Problems to be Solved by the Invention

However, with the antenna device of Patent Document 1, since the elevation servomotor is disposed in the vicinity of the antenna, the size of the antenna becomes large. Moreover, an electric wire needs to be arranged around the antenna so as to supply power to the elevation servomotor. Furthermore, the electric wire needs to be arranged so that it will not be entangled even when the antenna rotates.

Moreover, the waveguides are also required to be arranged so that they do not interfere with other members when the antenna rotates. In this regard, with the antenna devices of Patent Documents 1 and 2, the arrangement of the waveguides is not specifically disclosed.

With the antenna device of Patent Document 3, the disclosure is given about the arrangement of the waveguides and no more, and members configured to support the waveguides are not specifically described. Especially, this antenna device has the waveguides with long lengths and many bending positions, and thus, a propagation loss becomes large. Moreover, to support such waveguides, a complicated supporting mechanism is also required, and a size of the antenna can be considered to be large.

Further, Patent Document 3 does not disclose how to dispose a motor configured to horizontally rotate and vertically rotate. If the motor is disposed to the back side of the antenna as Patent Document 1, the similar problem to Patent Document 1 occurs.

This disclosure is made in view of the above situations and aims to provide an antenna device, which has a configuration in which waveguides are effectively disposed, the antenna device vertically rotatable and horizontally rotatable. Moreover, this disclosure also aims to provide a compact antenna device, which is able to be installed and operate even in a small space.

SUMMARY AND EFFECT(S) OF THE INVENTION

Problems to be solved by the present disclosure are described above, and means for solving the problems and effects thereof will be described below.

According to one aspect of this disclosure, an antenna device with the following configuration is provided. The antenna device includes an antenna part, a vertically rotating part, and a rotary joint. The antenna part is vertically rotatable to change an elevation angle and horizontally rotatable to change an azimuth, and outwardly radiates a radio wave. The vertically rotating part is disposed such that a longitudinal direction thereof is along an axial line of the vertical rotation and intersects perpendicularly with an axial line of the horizontal rotation. The rotary joint is coupled to the vertically rotating part. Further, the antenna device includes a waveguide path passing through the inside of the rotary joint and the inside of the vertically rotating part and connected with the antenna part.

Thereby, the vertical and horizontal rotational axial lines intersect with each other and the waveguide path is formed either one of at the intersecting position and in the vicinity thereof. Therefore, it can be prevented as much as possible that the waveguide path changes when the antenna part is rotated vertically or horizontally. Thus, the layout of the waveguide path can be simplified. Therefore, the supporting configuration of waveguides and the like becomes simple, and the size of the antenna device can be reduced.

In the antenna device, the waveguide path inside the rotary joint and inside the vertically rotating part preferably includes a part formed to extend along the axial line of the vertical rotation.

Thereby, the waveguide path is formed to extend along the vertical rotation axial line, and thus, it can be surely prevented that the waveguide path changes during the vertical rotation.

The antenna device is preferably configured as follows. That is, the antenna device includes a pair of supporting pillars supporting the vertically rotating part. The waveguide path includes a part passing between the two supporting pillars and connected with the rotary joint.

Thereby, the waveguide path does not need to go around much, and thus, a layout that the waveguide path becomes short can be achieved.

The antenna device is preferably configured as follows. That is, the antenna device includes a transmission shaft part disposed along the axial line of the vertical rotation and to which power for vertically rotating the antenna part is transmitted. The transmission shaft part is fixed to the antenna part by a pair of fixing members.

Thereby, the power generated by a motor can be transmitted to the antenna part via the transmission shaft part. Therefore, a configuration in which the motor is attached to other than the antenna part can be achieved.

In the antenna device, when coupling positions of the transmission shaft part to the fixing members are referred to as power transmission positions, the waveguide path preferably includes a part connected with the rotary joint between the two power transmission positions.

Thereby, the waveguide path does not need to go around much, and thus, the layout that the waveguide path becomes short can be achieved.

The antenna device is preferably configured as follows. That is, the antenna device includes counterweight parts, each including an arm-like member attached with a weight at one end thereof. The fixing members fix the other ends of the counterweight parts with the antenna part.

Thereby, the counterweight parts need to be rotated together with the vertical rotation of the antenna part. Therefore, by attaching the fixing members to the counterweight parts, the rational layout can be achieved.

The antenna device is preferably configured as follows. That is, the antenna device includes a rotational pedestal, a vertical rotation motor, and a horizontal rotation motor. The rotational pedestal at least supports the antenna part and the vertically rotating part, and integrally rotates when horizontally rotating. The vertical rotation motor is a motor for the vertical rotation disposed below the rotational pedestal. The horizontal rotation motor is a motor for the horizontal rotation disposed below the rotational pedestal.

Thereby, the two motors that are comparatively heavy can be disposed in a lower part of the antenna device, and thus, the center of gravity of the antenna device can be lowered to improve its stability.

The antenna device is preferably configured as follows. That is, the antenna device includes a horizontally rotating part disposed along the axial line of the horizontal rotation and disposed along the axial line of the horizontal rotation. Gears configured to transmit power of the horizontal rotation motor are attached to integrally rotate with the horizontally rotating part. Gears configured to transmit power of the vertical rotation motor are attached to the horizontally rotating part via a bearing.

Thereby, the vertical rotation and the horizontal rotation can be performed independently from each other, while intensively disposing the transmission gears.

The antenna device is preferably configured as follows. That is, the antenna device includes a motor controller configured to control the vertical rotation motor and the horizontal rotation motor. The motor controller controls the vertical rotation motor and the horizontal rotation motor to prevent the horizontal rotation when vertically rotating or prevent the vertical rotation when horizontally rotating.

Thereby, an elevation angle and an azimuth can be adjusted independently from each other, and thus, the adjustment can be easy.

The antenna device is preferably used to observe a meteorological status.

Thereby, the effects of this disclosure can be exerted with an antenna device for a meteorological observation.

MODE(S) FOR CARRYING OUT THE INVENTION

Figure 1:
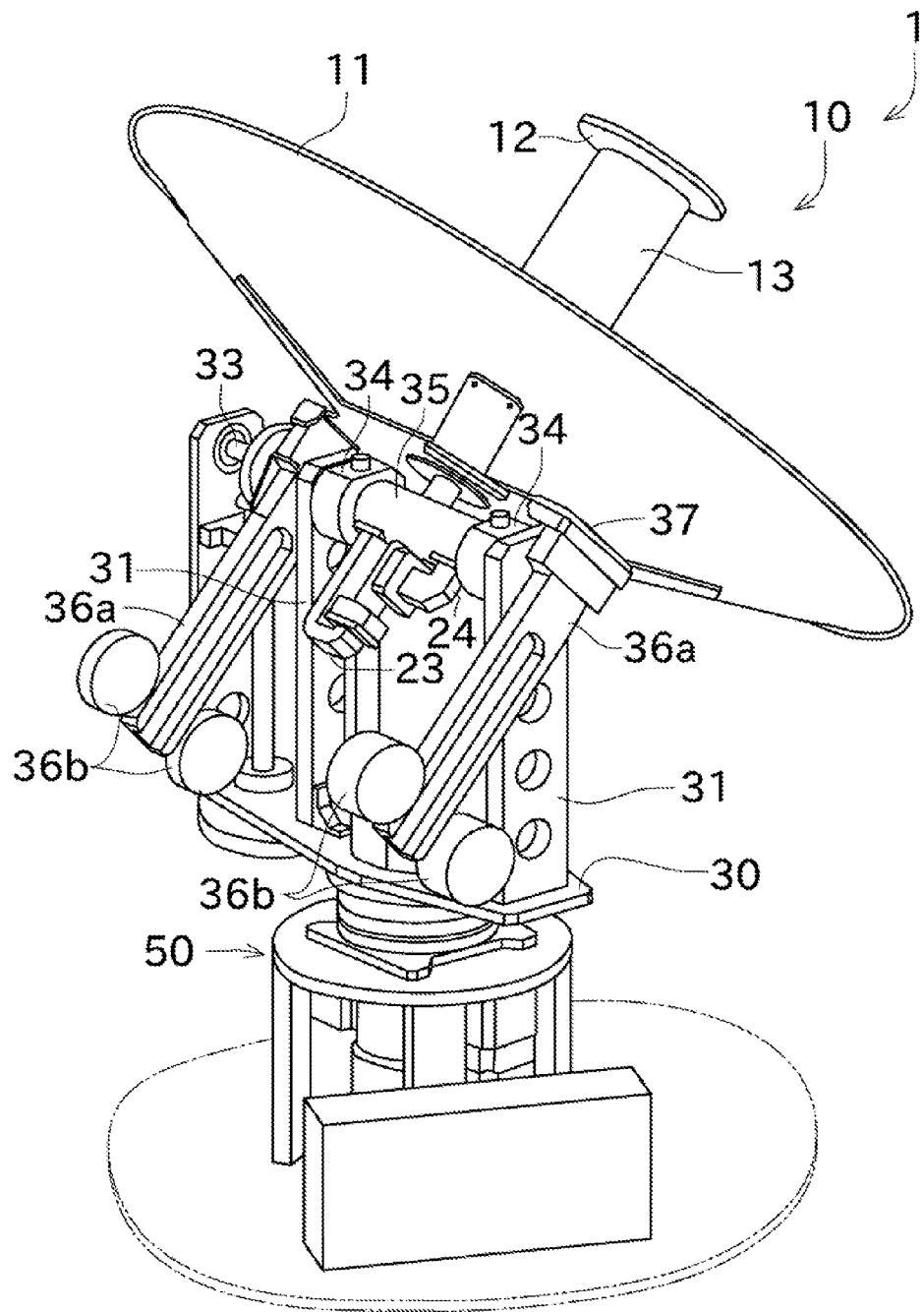
FIG. 1 is a perspective view illustrating an antenna device according to one embodiment of this disclosure.
Figure 2:
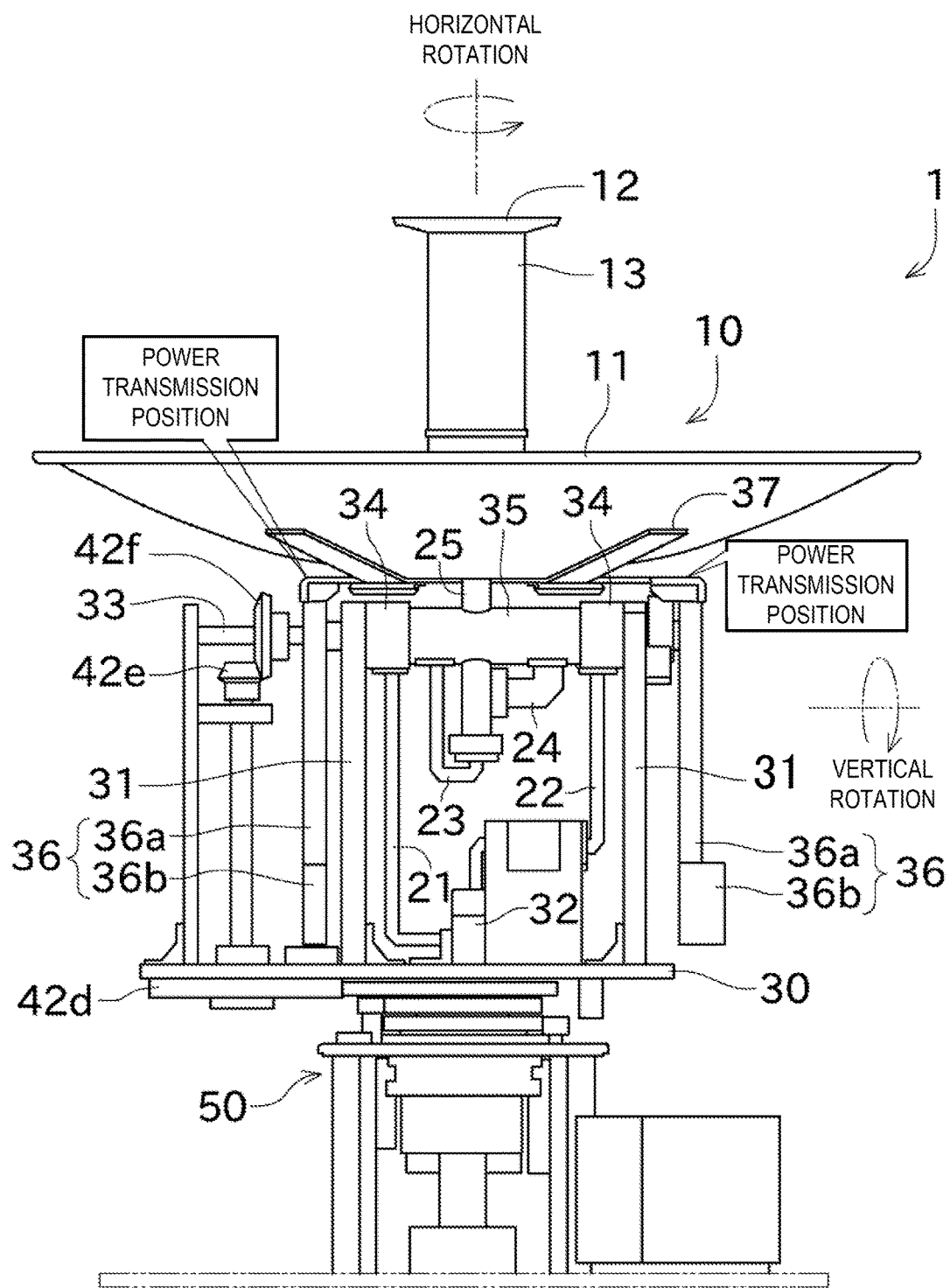
FIG. 2 is an elevational view of the antenna device when an antenna part is oriented upward.
Figure 3:
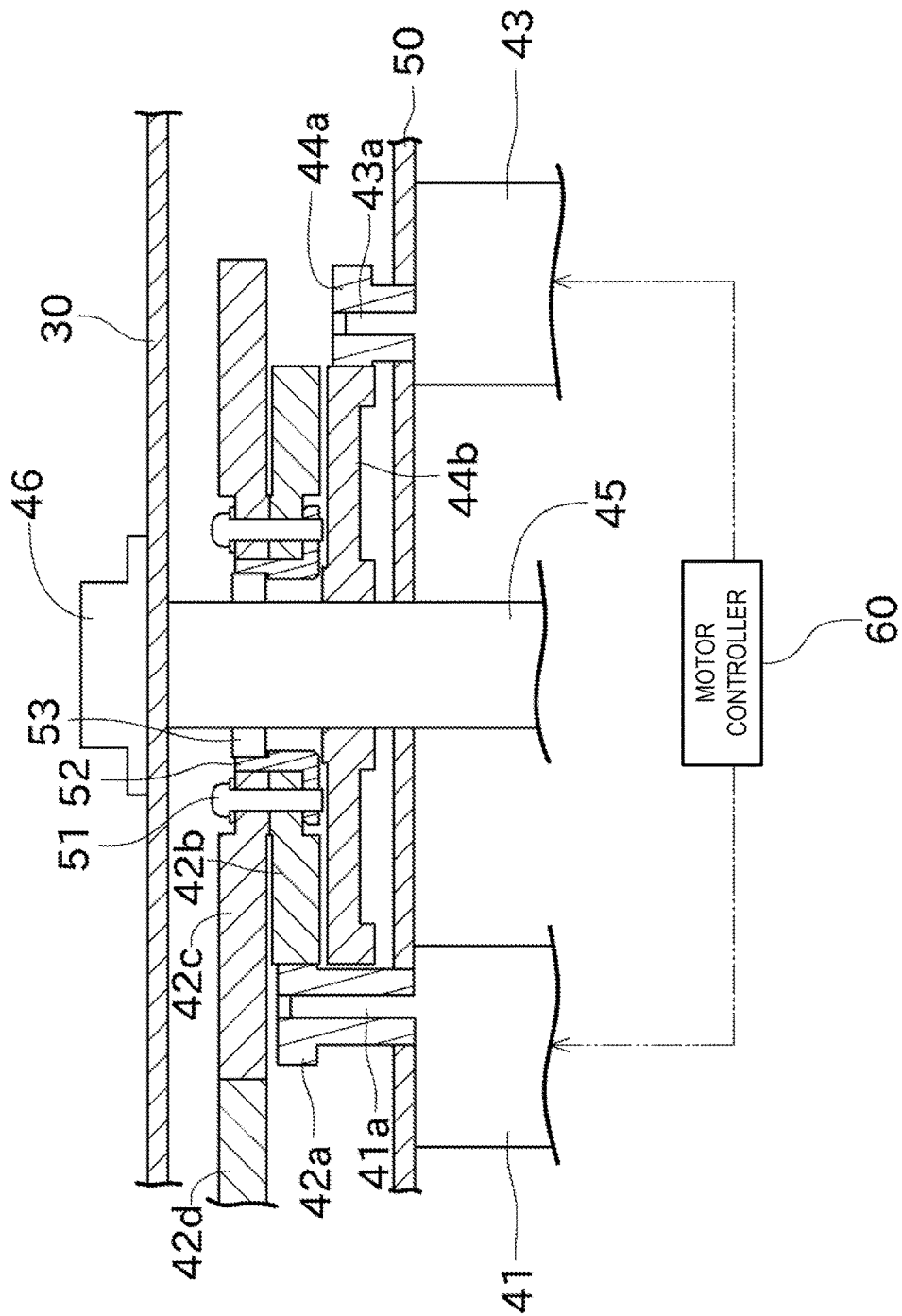
FIG. 3 is a schematic cross-sectional view illustrating a structure of a power transmitting part.
Figure 4:
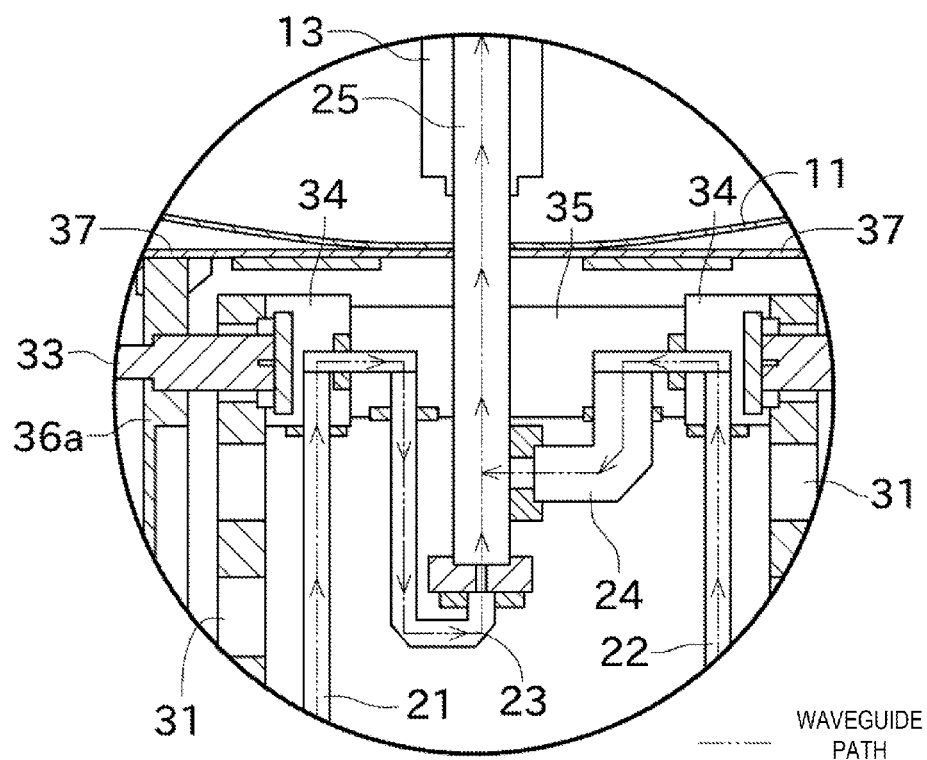
FIG. 4 is a partial cross-sectional view illustrating a state of the vicinity of a vertically rotating part.

Next, embodiments of this disclosure are described with reference to the drawings. FIG. 1 is a perspective view of an antenna device 1. FIG. 2 is an elevational view of the antenna device 1. FIG. 3 is a schematic cross-sectional view illustrating a structure of a power transmitting part. FIG. 4 is a partial cross-sectional view illustrating a state of the vicinity of a vertically rotating part. Note that, in the following description, the reference of the "rotational axial line" indicates a virtual straight line extending a rotational axis and the reference of, for example, either one of the "rotary part" and the "shaft part" indicates a member to serve as a rotational shaft.

The antenna device 1 configures a radar apparatus together with a non-illustrated radio wave generator (e.g., a magnetron), a controller and the like. The antenna device 1 is used, for example, for meteorological observation; however, it can also be used for other applications (e.g., satellite communication). Moreover, a radio wave generated by the radio wave generator is outwardly radiated from an antenna part 10, through the inside of waveguides and respective components. Hereinafter, the paths where this radio wave passes through are collectively referred to as the "waveguide path."

The antenna device 1 includes a pedestal 50 as illustrated, for example, in FIG. 1. This pedestal 50 has legs and a supporting plate fixed to the legs. As illustrated in FIG. 3, a vertical rotation motor 41, a horizontal rotation motor 43, and a horizontally rotating part 45 are disposed in the vicinity of the supporting plate of this pedestal 50.

The horizontal rotation motor 43 generates power to horizontally rotate the antenna part 10 (rotate in a direction of changing its azimuth). Moreover, the horizontal rotation motor 43 includes a motor shaft 43a. A rotation of this motor shaft 43a is transmitted to the horizontally rotating part 45 via transmission gears 44a and 44b. Note that, rotations of the vertical rotation motor 41 and the horizontal rotation motor 43 are controlled by a motor controller 60.

The horizontally rotating part 45 is a rotational shaft when horizontally rotating the antenna part 10. Moreover, as illustrated in FIG. 3, the horizontally rotating part 45 is fixed to a rotational pedestal 30 by a fixing member 46. With this configuration, by rotating the horizontal rotation motor 43, the rotational pedestal 30 can be rotated.

Moreover, two ways (for vertical polarized wave and for horizontal polarized wave) of waveguide paths are formed inside the horizontally rotating part 45. These waveguide paths are connected, via non-illustrated rotary joints, with waveguide paths disposed on the rotational pedestal 30 side (specifically, waveguide paths inside a waveguide connecting part 32). With this configuration, even when the rotational pedestal 30 is horizontally rotated, the waveguide paths thereinside do not rotate. Therefore, the horizontal rotation can be performed in a state where the connection among the waveguide paths is maintained.

The vertical rotation motor 41 generates power to vertically rotate the antenna part 10 (rotate in a direction of changing its elevation angle). Moreover, the vertical rotation motor 41 includes a motor shaft 41*a*. A rotation of this motor shaft 41*a* is transmitted by transmission gears 42*a* to 42*f*.

Specifically, the transmission gear 42*a* is attached to integrally rotate with the motor shaft 41*a*. The transmission gear 42*b* is meshed with the transmission gear 42*a* and also integrally rotates with the transmission gear 42*c* via threads 51 and a coupling member 52. Moreover, the transmission gear 42*c* is attached to the horizontally rotating part 45 via a bearing 53.

With this configuration, the horizontally rotating part 45 and the transmission gears 42*b* and 42*c* can be rotated independently. Therefore, the horizontal rotation and the vertical rotation can be performed independently from each other while coaxially disposing the transmission gears for horizontal rotation and the transmission gears for vertical rotation.

The transmission gear 42*c* is arranged to mesh with the transmission gear 42*d*. This transmission gear 42*d* is fixed to a gear shaft provided to penetrate the rotational pedestal 30 in up and down directions. An upper end of this gear shaft is fixed with the transmission gear 42*e*. The transmission gears 42*e* and 42*f* are bevel gears and arranged such that their rotational axes intersect perpendicularly to each other. Moreover, this transmission gear 42*f* is fixed to a transmission shaft part 33. With the above configuration, by rotating the vertical rotation motor 41, the transmission shaft part 33 can be rotated.

Moreover, the motor controller 60 controls the vertical rotation motor 41 and the horizontal rotation motor 43 to prevent the horizontal rotation when rotating vertically or prevent the vertical rotation when rotating horizontally. Thus, the adjustment of the elevation angle and the azimuth can be easy. For example, when only performing the horizontal rotation without the vertical rotation, the respective motors are rotated in synchronization to each other. Examples of the synchronization control of the motors include a pulse control that is known conventionally. Moreover, by flexibly controlling the respective motors, the adjustment of the elevation angle and the azimuth can easily and flexibly be performed.

As illustrated in FIG. 2, the rotational pedestal 30 is attached with supporting pillars 31 and the waveguide connecting part 32. The waveguide connecting part 32 is connected with waveguides 21 and 22 configured to transmit the vertical and horizontal polarized waves described above.

The supporting pillars 31 rotatably support, at its upper part, the transmission shaft part 33. Moreover, the transmission shaft part 33 is rotated by the power of the vertical rotation motor 41 to integrally rotate with rotary joints 34, a vertically rotating part 35, counterweight parts 36, and the antenna part 10. Hereinafter, each of the members is described.

The rotary joints 34 are provided as a pair, and as illustrated in FIG. 4, they are connected with the waveguides 21 and 22, respectively. Moreover, the waveguide paths pass through inside the rotary joints 34. The rotary joints 34 are configured such that positions of the waveguide paths therein do not change even when the rotary joints 34 rotate. Therefore, the vertical rotation can be performed in the state where the connection between the waveguides 21 and 22 is maintained.

The vertically rotating part 35 is a long member, and its longitudinal direction coincides with a vertical rotational axial line and intersects perpendicularly to a horizontal rotational axial line. Moreover, the waveguide paths go through the rotary joints 34, respectively, and then pass inside the vertically rotating part 35. Further, the waveguide paths perpendicularly bend downward and then pass through waveguides 23 and 24. These waveguides 23 and 24 are connected with the waveguide 25. Note that, this waveguide 25 is connected with the antenna part 10 along the rotational axial line of the horizontally rotating part 45.

Thus, in this embodiment, inside the vertical rotary part 35, the vertical and horizontal rotational axial lines intersect with each other and the waveguide paths are formed either one of at the intersecting position and in the vicinity thereof. Therefore, it can be prevented as much as possible that the waveguide paths change when the antenna part 10 is rotated. Further, in this embodiment, this vertically rotating part 35 and the waveguides 21 to 24 are in between the two supporting pillars 31 and disposed between the two counterweight parts 36. Therefore, the layout of the waveguide paths and the waveguides can be simple and rational.

Each of the counterweight parts 36 includes an arm-like member 36*a* and weights 36*b* attached to an end of the arm-like member 36*a*. The arm-like member 36*a* is fixed, on its upper side (opposite side to the weights 36*b*), to a back face of the antenna part 10 (specifically, a main reflection mirror 11 described later) by a fixing member 37. Therefore, the antenna part 10 rotates along with the rotation of the transmission shaft part 33.

With this configuration, when rotating vertically as illustrated in FIG. 1, the weights 36*b* are located on the opposite side to the antenna part 10, sandwiching the transmission shaft part 33 therebetween. Thus, the counterweight parts 36 function as counterweights when vertically rotating the antenna part 10 (reduce the power required for the rotation).

Here, when connecting positions of the fixing member 37 with the arm-like members 36*a* (positions where the power of the transmission shaft part 33 is transmitted to the antenna part 10) are referred to as power transmission positions (FIG. 2), and also, in this embodiment, the waveguides 21 and 22 are connected with the rotary joints 34 between the two power transmission positions.

Next, the antenna part 10 is described. As illustrated in FIG. 1, the antenna part 10 includes the main reflection mirror 11, a sub reflection mirror 12, and a sub reflection mirror supporting part 13.

The waveguide 25 is disposed inside the sub reflection mirror supporting part 13. The radio wave transmitted in the waveguide 25 is radiated to spread from an opening of the waveguide 25.

The sub reflection mirror supporting part 13 is a cylindrical member attached so as to cover the waveguide 25. The sub reflection mirror supporting part 13 supports the sub reflection mirror 12. Moreover, in the sub reflection mirror supporting part 13, at least an upper side (the sub reflection mirror 12 side) is made of a material with high transmittance for radio waves.

The sub reflection mirror 12 is disposed to face the opening of the waveguide 25. The sub reflection mirror 12 is made of a material with high reflectance for radio waves. The sub reflection mirror 12 reflects the radio wave radiated from the opening of the waveguide 25 toward the main reflection mirror 11.

The main reflection mirror 11 is disposed to face the sub reflection mirror supporting part 13. The main reflection mirror 11, similar to the sub reflection mirror 12, is made of a material with high reflectance for radio waves. A surface of the main reflection mirror 11 is parabolic. The main reflection mirror 11 reflects the radio wave radiated from the sub reflection mirror 12. Thus, a plane wave can be outwardly radiated.

The radio wave radiated from the main reflection mirror 11 reflects on, for example, rain or cloud. The antenna device 1 can receive this reflection wave by the reverse flow of the reflection wave in the path of the radio wave described above. Then, for example, the controller of the radar apparatus analyzes this reflection wave and, thus, the antenna device 1 can obtain position, size, and density of water droplet.

As described above, the antenna device 1 includes the antenna part 10, the vertically rotating part 35, and the rotary joints 34. The antenna part 10 can vertically and horizontally rotate, and outwardly radiates the radio wave. The vertically rotating part 35 is arranged such that its longitudinal direction is along the vertical rotational axial line and intersects perpendicularly to the horizontal rotational axial line. The rotary joints 34 are coupled to the vertically rotating part 35. Moreover, the antenna device 1 has the waveguide paths passing through the inside of the rotary joints 34 and the vertically rotating part 35 to be connected with the antenna part 10.

Thus, the vertical and horizontal rotational axial lines intersect with each other, and the waveguide paths are formed either one of at the intersecting position and in the vicinity thereof. Therefore, it can be prevented as much as possible that the waveguide paths change when the antenna part is rotated vertically or horizontally. Thus, the waveguide paths can be simplified (do not significantly go off the horizontal rotational axis). Therefore, since the waveguides 21 and 22 are sufficiently supported only by being connected with the rotary joints 34, the supporting configuration becomes simple, and the size of the antenna device 1 can be reduced.

Figure 5:
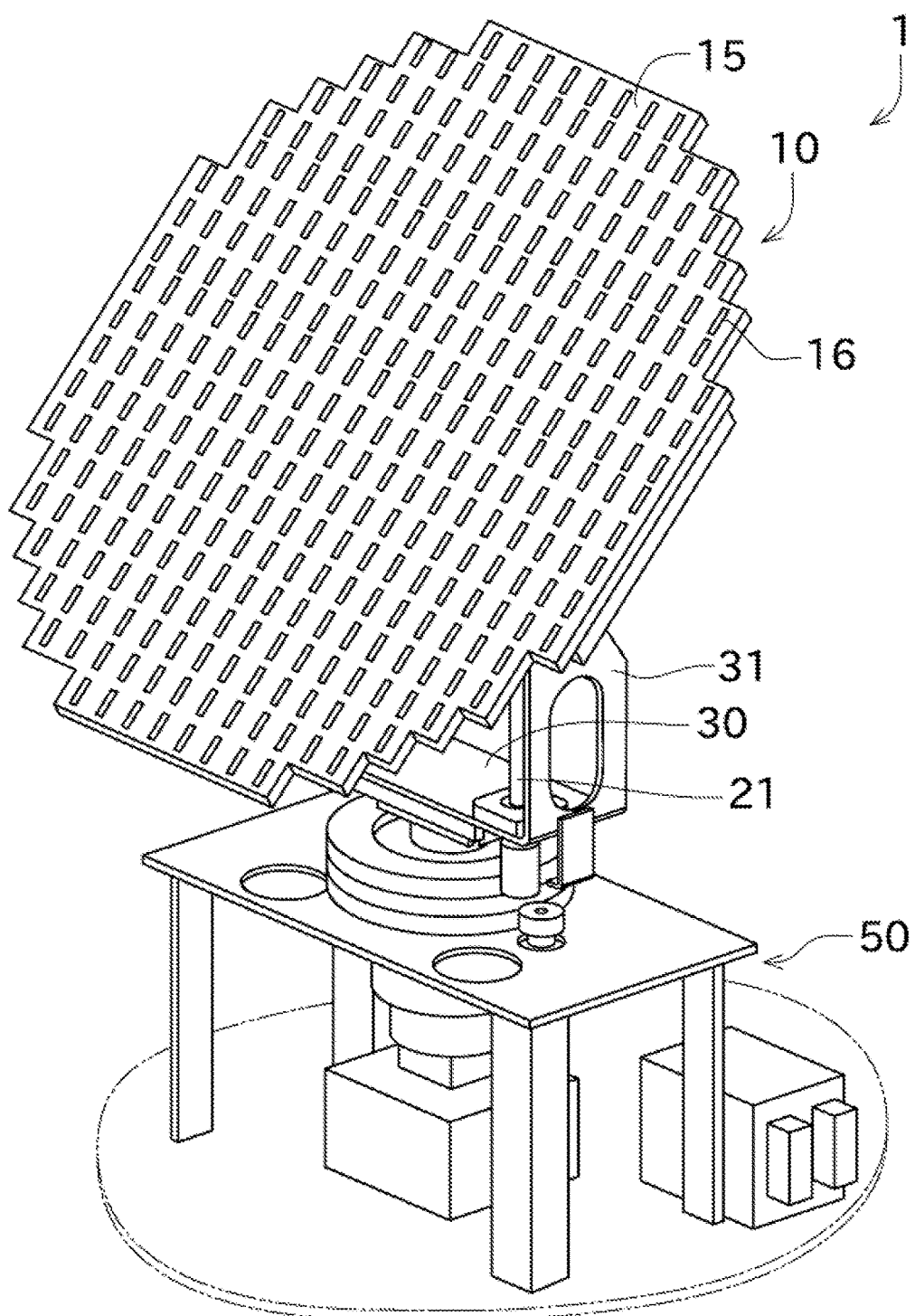
FIG. 5 is a perspective view illustrating the antenna device according to another embodiment.
Figure 6:
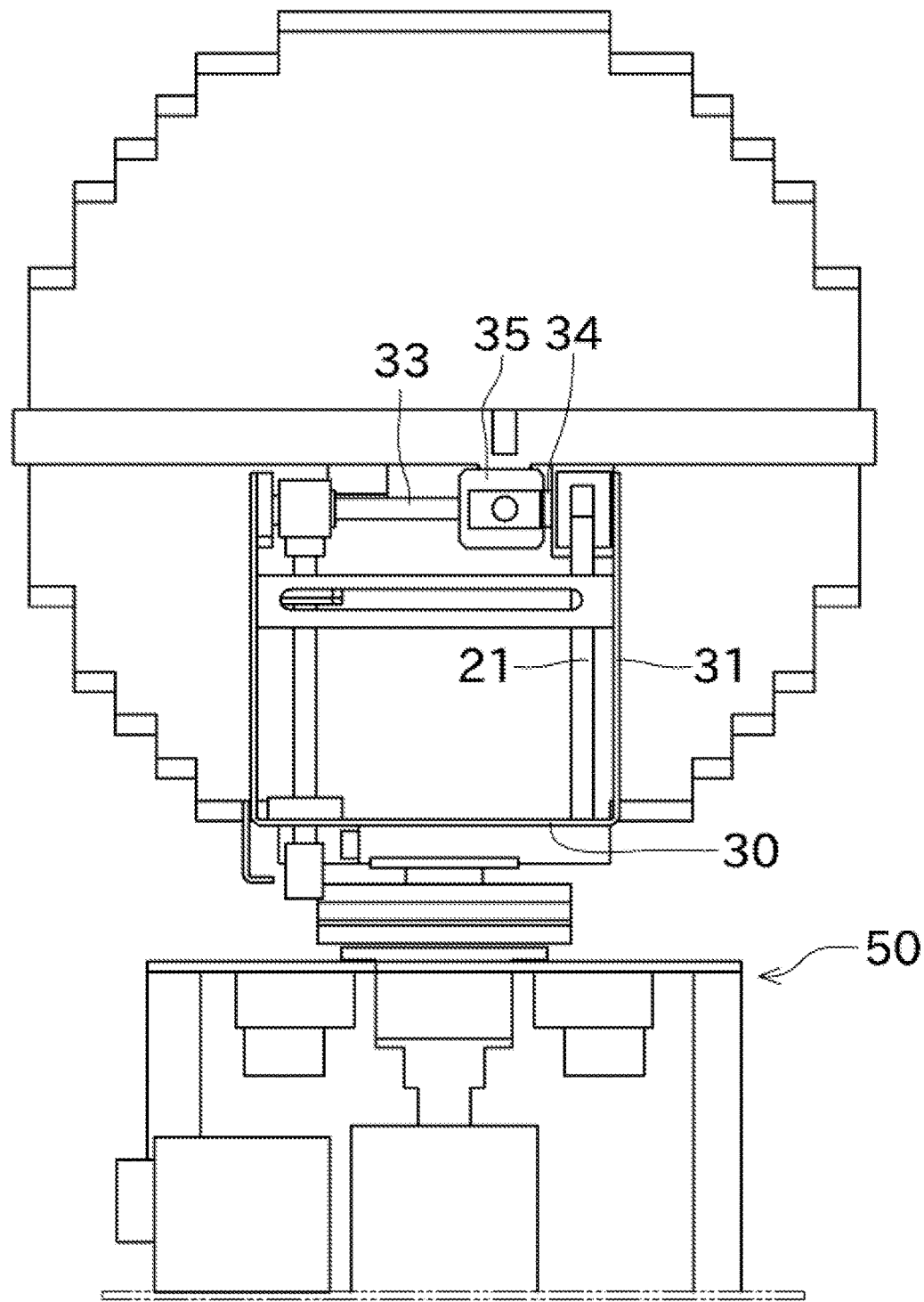
FIG. 6 is an elevational view of the antenna device according to the other embodiment.

Next, another embodiment is described. FIG. 5 is a perspective view illustrating an antenna device 1 according to this embodiment. FIG. 6 is an elevational view of this antenna device 1. Note that, in the description of this embodiment, the same or similar members compared to the embodiment described above are denoted with the same reference numerals in the drawings, and the description thereof may be omitted.

In the above embodiment, two ways of waveguide paths are formed so as to outwardly radiate the vertical and horizontal polarized waves. On the other hand, in this embodiment, only a single way of waveguide path is formed. Therefore, in this embodiment, a slot array antenna is adopted as an antenna part 10 instead of a parabola antenna.

The antenna part 10 of this embodiment includes a radiation waveguide part 15. The radiation waveguide part 15 is formed by two sheets of plane plates facing each other, and a part coupling them. Moreover, this plane plates are formed with slots 16, and the radio wave can be outwardly radiated from these slots 16.

The antenna device 1 of this embodiment, similar to the above embodiment, can rotate the antenna part 10 in the vertical and horizontal directions. The supporting mechanism and the power transmitting mechanism are substantially the same as the above embodiment. As difference points, a point that this embodiment has the configuration in which only one rotary joint 34 is provided since it has the single way of waveguide path, and a point that the waveguide path is much simpler can be given. Moreover, since the weight of the parts that rotate is small, the counterweight parts are not provided, and further, the rotational pedestal 30 and the supporting pillars 31 are formed by bending a single metal plate.

Although the preferred embodiments of this disclosure are described above, the above configurations may be modified as follows, for example.

The operations of the vertical and horizontal rotation motors 41 and 43 are transmitted via the gears; however, a configuration may be adopted, in which a part of the transmission may be performed by a belt and a pulley.

Figure 7:
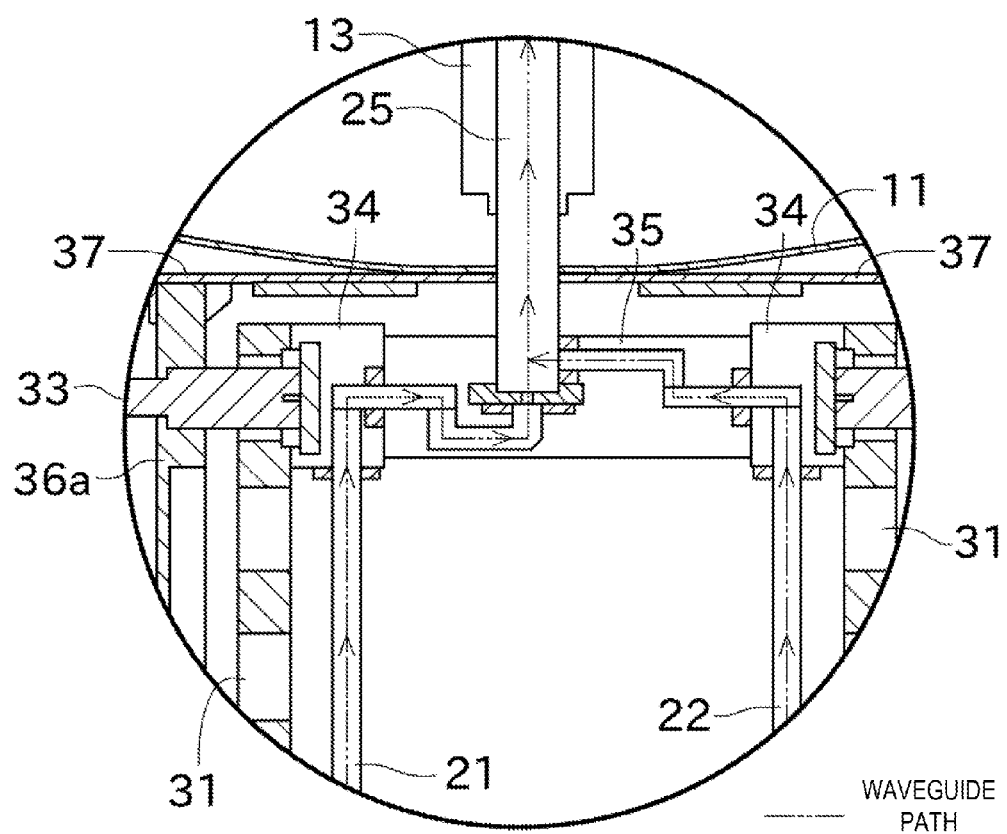
FIG. 7 is a partial cross-sectional view illustrating another example of the waveguide path.

The shape of each member configuring the antenna device 1 is arbitrary, and can suitably be changed. Moreover, as long as the configuration of this application is achieved, the arrangement of each member may be changed or the member may be omitted. For example, the waveguides 23 and 24 of the above embodiment are not essential components, and can be omitted by forming waveguide paths as illustrated in FIG. 7. In FIG. 7, a state in which the waveguide paths inside the vertically rotating part 35 are directly connected with the waveguide 25 (without any other waveguide therebetween) is illustrated. The configuration in which the waveguide paths are connected directly to the waveguide 25 from the inside of the vertically rotating part 35 as above is also achievable in the case where the single waveguide path is provided.

In a case where the waveguide path of the horizontal polarized wave and the waveguide path of the vertical polarized wave have a path difference, a waveguide may be arranged to eliminate the path difference, or an operation for eliminating the influence of the path difference may be performed.

DESCRIPTION OF REFERENCE NUMERAL(S)

1 Antenna Device
10 Antenna Part
21 to 25 Waveguide
33 Rotation Transmitting Shaft
34 Rotary Joint
35 Vertically Rotating Part
36 Counterweight Part
37 Fixing Member
41 Vertical Rotation Motor
43 Horizontal Rotation Motor
45 Horizontally Rotating Part

The invention claimed is:
1. An antenna device, comprising:
an antenna part configured to be vertically rotatable to change an elevation angle and horizontally rotatable to change an azimuth, and to outwardly radiate a radio wave;
a vertically rotating part disposed such that a longitudinal direction thereof is along an axial line of the vertical rotation and intersects perpendicularly with an axial line of the horizontal rotation;
a rotary joint coupled to the vertically rotating part; and
a waveguide path passing through the inside of the rotary joint and the inside of the vertically rotating part and connected with the antenna part, wherein a waveguide of the waveguide path is formed at, or in the vicinity of, the intersecting position of the vertical and the horizontal rotational axial lines.

2. The antenna device of claim 1, wherein the waveguide path inside the rotary joint and inside the vertically rotating part includes a part formed to extend along the axial line of the vertical rotation.

3. The antenna device of claim 1, comprising a pair of supporting pillars supporting the vertically rotating part,
wherein the waveguide path includes a part passing between the two supporting pillars and connected with the rotary joint.

4. The antenna device of claim 1, comprising a transmission shaft part disposed along the axial line of the vertical rotation and to which power for vertically rotating the antenna part is transmitted,
wherein the transmission shaft part is fixed to the antenna part by a pair of fixing members.

5. The antenna device of claim 4, wherein when coupling positions of the transmission shaft part to the fixing members are referred to as power transmission positions, the waveguide path includes a part connected with the rotary joint between the two power transmission positions.

6. The antenna device of claim 4, comprising counterweight parts, each including an arm-like member attached with a weight at one end thereof,
wherein the fixing members fix the other ends of the counterweight parts with the antenna part.

7. The antenna device of claim 1, comprising:
a rotational pedestal at least supporting the antenna part and the vertically rotating part and configured to integrally rotate when horizontally rotating;
a vertical rotation motor that is a motor for the vertical rotation disposed below the rotational pedestal; and
a horizontal rotation motor that is a motor for the horizontal rotation disposed below the rotational pedestal.

8. The antenna device of claim 7, comprising a horizontally rotating part disposed along the axial line of the horizontal rotation and configured to integrally rotate with the rotational pedestal,
wherein gears configured to transmit power of the horizontal rotation motor are attached to integrally rotate with the horizontally rotating part, and
wherein gears configured to transmit power of the vertical rotation motor are attached to the horizontally rotating part via a bearing.

9. The antenna device of claim 8, comprising a motor controller configured to control the vertical rotation motor and the horizontal rotation motor,
wherein the motor controller controls the vertical rotation motor and the horizontal rotation motor to prevent the horizontal rotation when vertically rotating or prevent the vertical rotation when horizontally rotating.

10. The antenna device of claim 1, wherein the antenna device is used to observe a meteorological status.

* * * * *